UNITED STATES PATENT OFFICE.

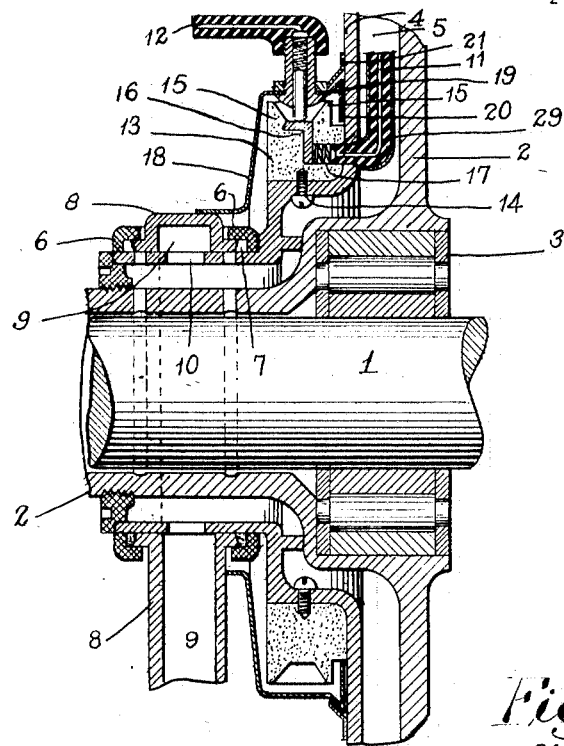
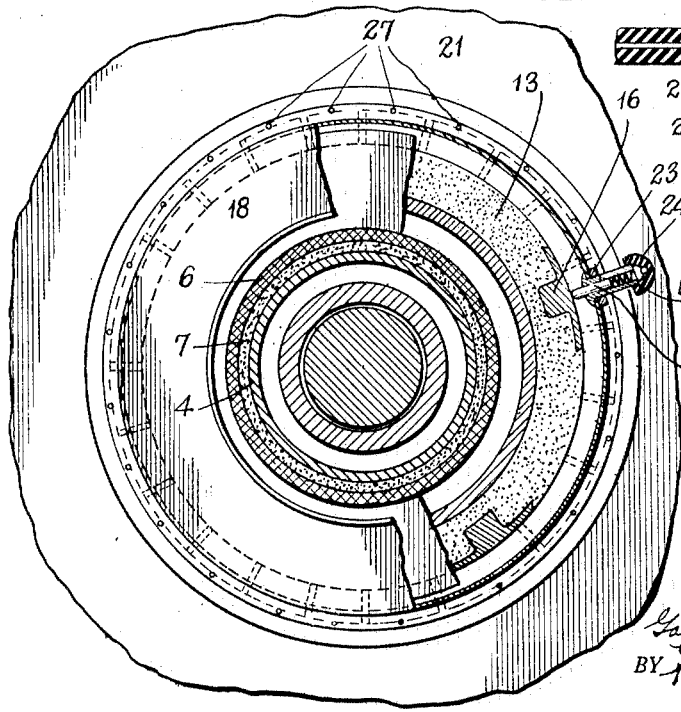
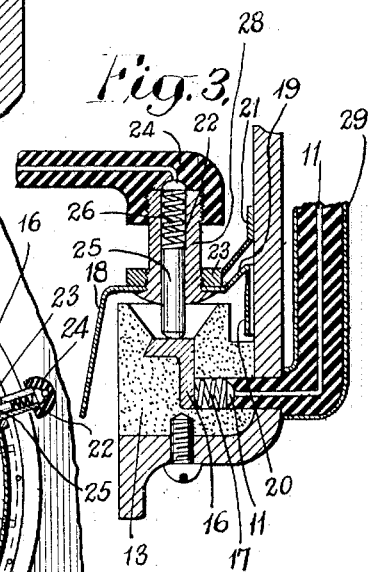

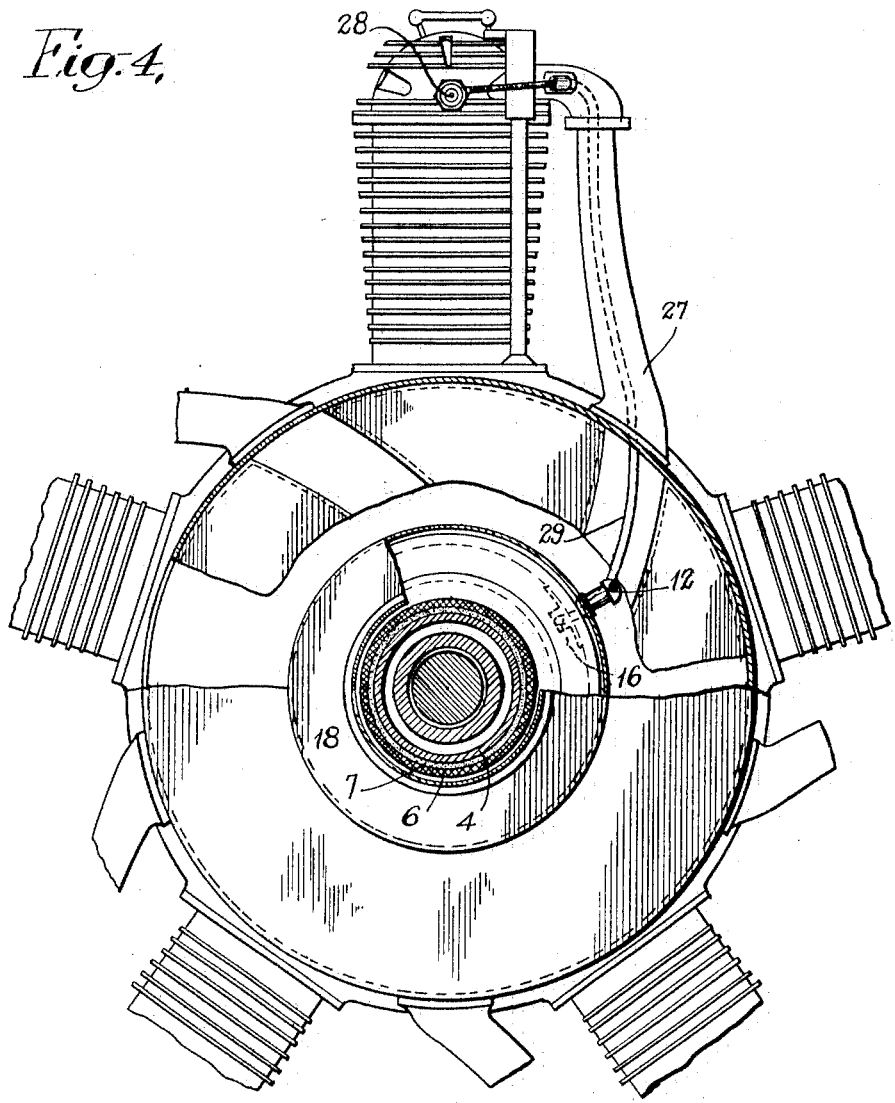

GABRIEL MIDBOE, OF BROOKLYN, AND CLOVIS C. PITTMAN, OF NEW YORK, N. Y., ASSIGNORS TO RICHARD P. LYDON, OF NEW YORK, N. Y.

IGNITION SYSTEM FOR INTERNAL-COMBUSTION ENGINES.

1,315,736. Specification of Letters Patent. Patented Sept. 9, 1919.

Application filed October 28, 1916. Serial No. 128,177.

*To all whom it may concern:*

Be it known that we, GABRIEL MIDBOE and CLOVIS C. PITMAN, citizens of the United States, the former being a resident of the borough of Brooklyn, city of New York, in the county and State of New York, and the latter a resident of the borough of Bronx, city of New York, in the county of Bronx and State of New York, respectively, have invented certain new and useful Improvements in Ignition Systems for Internal-Combustion Engines, of which the following is a specification.

This invention relates to ignition systems for internal combustion engines, and is particularly adapted to rotary internal combustion engines of the type more clearly shown and described in our co-pending application, Serial No. 120,422, renewed Sept. 15, 1916.

The invention is particularly addressed to providing an ignition system adapted for use in rotary internal combustion engines where the engine is exposed to the elements as in aeroplane motors, and is addressed to obviating short-circuits caused by moisture getting into the electrical system, with its consequent troubles.

In the drawings we have only shown a portion of an engine, the engine being more clearly shown in detail in the co-pending application referred to.

In the drawings, Figure 1 is a sectional view of a portion of a rotary internal combustion engine provided with our improved ignition system;

Fig. 2 is an end view of Fig. 1; showing parts broken away;

Fig. 3 is an enlarged view of a portion of Fig. 1; and

Fig. 4 is a view of a portion of a rotary engine showing parts of the ignition system.

In the drawings, 1 is a fixed crank shaft. 2 is a rotating crank case. 3 is a roller bearing for same. 4 is the outer casing of the manifold 5. 6, 6 are stuffing boxes to form a gas-tight connection between manifold casing 5 and sleeve 8. 8 is a sleeve surrounding a portion of the manifold and provided with a passage 9 leading from the carbureter. In the casing 4 of the manifold are provided a plurality of openings 10 for permitting the fuel gases to pass from the passage 9 in the sleeve 8 into the manifold 5 from whence it is distributed to its points of utilization. 11 is an electric conductor or wire covered with suitable non-conducting material leading through the fuel-supply pipe 27 within a tube 29 out through the casing thereof, to the spark plug 28. 12 is an electric conductor or wire surrounded by suitable non-conducting material leading from a magneto or other source of electrical supply. 13 is a disk or circular plate made of suitable non-conducting material fixedly mounted on the outer shell 4 of the manifold and held there by suitable screws 14. This non-conducting disk or circular plate is provided on its periphery with a groove formed between the portions 15, 15. Located within the groove, at a plurality of points depending upon the number of cylinders in the engine, are contact plates 16 of suitable metal or other conducting material. These plates 16 are embedded in the disk 13 and are preferably L-shaped, as shown. The conductor 11 is kept in contact with these plates 16 by coil spring 17. 18 is a disk plate fixedly mounted on the sleeve 8 so that it is held fixed and will not rotate with the crank case. This disk plate is formed so that it passes across the periphery of the non-conducting plate 13, entirely covers the periphery and is then provided with an outwardly flaring flange 19 and then an inwardly projecting flange 20 adapted to lie parallel to the shell 4 of the manifold. Mounted upon the casing of the manifold 4 is a circular plate 21 so arranged that a portion of it passes over the flange 19 and lies parallel therewith to prevent any moisture or water from passing in between the flange 20 and the manifold casing 4.

In the flange 21, located near the point of junction with the manifold casing 4, are provided a plurality of holes 27 so that in the event of any moisture or water collecting on the underside of this flange, the rotation of the engine, creating centrifugal force, will tend to throw the water or other liquid out through the holes 27. 12 is a conductor leading from a magneto, or other suitable source of electrical supply, to a contact member which, as shown, is a carbon brush 25, contact being maintained between the carbon brush 25 and the conductor 12 by the spring 26 located in the passage 22 in the bolt 28 made of a non-conducting material. This bolt 28, having in it the passage 22, is held in place by its head and lock-nut 23 on opposite sides of the disk 18.

It will be seen from the foregoing that the carbon brush 25 is kept in constant contact with the disk 13 in the groove on its periphery so that as the disk rotates with the engine, the carbon brush contacts with each of the contact plates 16, in turn, so as to close the circuit to the spark plug according to the demands of the engine.

Having described our invention, what we claim as new and desire to secure by Letters Patent is:

1. In a rotary internal combustion engine, a rotating crank case, a non-conducting plate rotating with said case, a groove in the periphery of said plate, contact members located in said groove, one for each of the cylinders of said engine, a fixed non-rotating cover provided with a flange extending across the periphery of said non-conducting plate and provided with a flange extending outwardly therefrom and then in toward the axis of the crank case and a rotating flange mounted on said crank case and rotating therewith extending outwardly and over a portion of said fixed flange.

2. In a rotary internal combustion engine, a rotating crank case, a non-conducting plate rotating with said case, contact members carried by said plate, one for each of the cylinders of said engine, a fixed non-rotating cover provided with a flange extending across the periphery of said non-conducting plate and provided with a flange extending outwardly therefrom and then in toward the axis of the crank case, a rotating flange mounted on said crank case and rotating therewith extending outwardly and over a portion of said fixed flange and a plurality of passages through said rotating flange.

3. In a rotary internal combustion engine, a rotary crank case, a plurality of cylinders mounted thereon, a rotating plate formed of suitable non-conducting material, a plurality of contact members carried by said plate, one for each of the cylinders, a contact member adapted to be brought into contact with each of the first-mentioned contact members by rotation of said plate, a non-rotating cover and a rotating flange adapted to overlap a portion of said cover.

4. In a rotary internal combustion engine, a rotary crank case, a plurality of cylinders mounted thereon, a rotary plate formed of suitable non-conducting material rotating with said crank case, a plurality of contact members carried by said plate, one for each of the cylinders, a fixed contact member adapted to be brought into contact with each of the first-mentioned contact members by rotation of said plate, an ignition plug in each of said cylinders, a conductor leading from each of the said first-mentioned contact members to its companion ignition plug, said conductor passing through a conduit located within the fuel-supply conduit, a non-rotating cover for said plate and a rotating flange adapted to overlap a portion of said cover.

5. In a rotary internal combustion engine, a rotary crank case, a plurality of cylinders mounted thereon, a plate formed of suitable non-conducting material fixedly rotating with said crank case, a plurality of contact members carried by said plate, one for each of the cylinders, a non-rotating cover for said plate and a flange rotating with the crank case adapted to overlap a portion of said cover.

6. In a rotary internal combustion engine, a rotary crank case, a plurality of cylinders mounted thereon, a plate formed of suitable non-conducting material fixedly mounted on said crank case, a plurality of contact members carried by said plate, one for each of the cylinders, a non-rotating cover for said plate, a contact member carried by said cover adapted to be brought into contact with each of the first-mentioned contact members by rotation of said crank case and a flange rotating with said crank case adapted to overlap a portion of said cover.

7. In a rotary internal combustion engine, a rotary crank case, a plurality of cylinders mounted thereon, a plate formed of suitable non-conducting material fixedly mounted on said crank case, a plurality of contact members carried by said plate, one for each of the cylinders, a non-rotating cover for said plate provided with an outwardly flaring flange and a flange rotating with said crank case adapted to overlap said outwardly flaring flange.

8. In a rotary internal combustion engine, a rotary crank case, a plurality of cylinders mounted thereon, a plate formed of suitable non-conducting material fixedly mounted on said crank case, a plurality of contact members carried by said plate, one for each of the cylinders, a non-rotating cover for said plate provided with an outwardly flaring flange and an inwardly extending flange.

9. In a rotary internal combustion engine, a rotary crank case, a plurality of cylinders mounted thereon, a plate formed of suitable non-conducting material fixedly mounted on said crank case, a plurality of contact members carried by said plate, one for each of the cylinders, a non-rotating cover for said plate provided with an outwardly flaring flange and an inwardly extending flange and a flange rotating with said crank case adapted to overlap said outwardly flaring flange.

10. In a rotary internal combustion engine, a rotary crank case, a plurality of cylinders mounted thereon, a plate formed of suitable non-conducting material fixedly mounted on said crank case, a plurality of contact members carried by said plate, one for each of the cylinders, a non-rotating cover for said plate provided with an outwardly flaring flange, a flange rotating with said crank case adapted to overlap a portion of said cover, and a contact member carried by said cover adapted to be brought into contact with each of the first-mentioned contact members by rotation of said crank case.

11. In a rotary internal combustion engine, a rotary crank case, a plurality of cylinders mounted thereon, a plate formed of suitable non-conducting material fixedly mounted on said crank case, a groove in said plate, a plurality of contact members carried by said plate located in said groove, a non-rotating cover for said plate, a flange rotating with said crank case adapted to overlap a portion of said cover and a contact member carried by said cover adapted to be brought into contact with each of the contact members in the said groove by rotation of said crank case.

12. In a rotary internal combustion engine, a rotary crank case, a plurality of cylinders mounted thereon, a disk formed of suitable non-conducting material fixedly mounted on said crank case, a groove in the periphery of said disk, a plurality of contact members carried by said disk located in said groove, one for each of the cylinders, a non-rotating cover for said disk provided with an outwardly flaring flange, a flange rotating with said crank case adapted to overlap said outwardly flaring flange, and a contact member carried by said cover adapted to be brought into contact with each of the contact members in said groove by rotation of said crank case.

13. In a rotary internal combustion engine, a rotary crank case, a plurality of cylinders mounted thereon, a plate formed of suitable non-conducting material fixedly mounted on said crank case, a plurality of contact members carried by said plate one for each of the cylinders, a non-rotating cover for said plate, a rotating flange mounted on the crank case and openings in said flange.

14. In a rotary internal combustion engine, a rotary crank case, a plurality of cylinders mounted thereon, a plate formed of suitable non-conducting material fixedly mounted on said crank case, contact members carried by said plate one for each of the cylinders, a non-rotating cover for said plate provided with an outwardly flaring flange, a flange rotating with said case adapted to overlap a portion of said outwardly extending flange, openings in said rotating flange, a contact member adapted to be brought into contact with each of the contact members in said groove by rotation of said crank case.

15. In a rotary internal combustion engine, a rotary crank case, a plurality of cylinders mounted thereon, a plate formed of suitable non-conducting material suitably mounted on the said crank case, a plurality of contact members carried by said plate, a non-rotating cover for said plate, a flange rotating with said crank case adapted to overlap a portion of said cover, and a contact member adapted to be brought into contact with each of the contact members on said plate by rotation of said crank case.

16. In a rotary internal combustion engine, a rotary crank case, a plurality of cylinders mounted therein, a disk formed of suitable non-conducting material fixedly mounted on said crank case, a plurality of contact members carried by said disk, one for each of the cylinders, a non-rotating cover for said disk provided with an outwardly flaring flange, a flange rotating with said crank case and adapted to overlap said outwardly flaring flange, and a contact member carried by said cover adapted to be brought into successive contact with each of the contact members carried by said plate by rotation of said crank case.

In testimony whereof, we have signed our names to this specification.

GABRIEL MIDBOE.
CLOVIS C. PITTMAN.

Copies of this patent may be obtained for five cents each, by addressing the "Commissioner of Patents, Washington, D. C."